(12) United States Patent
Adriaansen

(10) Patent No.: US 6,959,519 B2
(45) Date of Patent: Nov. 1, 2005

(54) CORRUGATED POLYMERIC ZIGZAG SHEET FOR GREENHOUSE ROOF STRUCTURES

(75) Inventor: Frans Adriaansen, Noord Brabant (NL)

(73) Assignee: General Electric, Pittsfield, MA (US)

( * ) Notice: Subject to any disclaimer, the term of this patent is extended or adjusted under 35 U.S.C. 154(b) by 18 days.

(21) Appl. No.: 10/249,009

(22) Filed: Mar. 10, 2003

(65) Prior Publication Data

US 2004/0177582 A1 Sep. 16, 2004

(51) Int. Cl.[7] .................................................. E04B 7/18
(52) U.S. Cl. ........................... 52/537; 52/18; 52/202; 52/473; 52/783.11; 52/786.1
(58) Field of Search ................. 52/18, 171.1, 202, 52/473, 783.11, 783.14, 786.1, 537, 783.15

(56) References Cited

U.S. PATENT DOCUMENTS

| | | | | |
|---|---|---|---|---|
| 1,895,553 A | * | 1/1933 | Nordell | .................... 52/783.12 |
| 2,086,571 A | * | 7/1937 | Novambere | .................. 52/410 |
| 2,173,815 A | * | 9/1939 | Slisz et al. | .................. 428/158 |
| 2,822,764 A | * | 2/1958 | Widman | .................... 52/405.1 |
| 3,038,573 A | * | 6/1962 | Nuernberger | .............. 52/483.1 |
| 3,208,189 A | * | 9/1965 | Hickman | .................... 52/534 |
| 1,207,617 A | | 10/1970 | Filmore | |
| 3,667,185 A | | 6/1972 | Maurer | |
| 3,959,943 A | * | 6/1976 | Shea et al. | ................ 52/783.14 |
| 4,184,476 A | * | 1/1980 | McArthur | .................... 126/632 |
| 4,186,541 A | * | 2/1980 | Sivachenko | .................. 52/630 |
| 4,498,455 A | * | 2/1985 | Gramm | ........................ 126/569 |
| 4,554,773 A | | 11/1985 | Conley | |
| 4,580,384 A | * | 4/1986 | Hutcheson | .................... 52/537 |
| 4,890,900 A | * | 1/1990 | Walsh | ........................ 359/596 |
| 4,955,570 A | * | 9/1990 | Benz et al. | .................. 248/300 |
| 5,457,921 A | * | 10/1995 | Kostrzecha | .................... 52/202 |
| 5,655,335 A | | 8/1997 | Vermeer | |
| 5,715,634 A | * | 2/1998 | Schultz | ........................ 52/200 |
| 6,079,168 A | * | 6/2000 | Shaver | ........................ 52/202 |
| 6,158,178 A | * | 12/2000 | Jeffers et al. | ............... 52/220.7 |
| 6,189,264 B1 | * | 2/2001 | DiVeroli | ........................ 49/57 |
| 6,615,555 B2 | * | 9/2003 | Madden | ........................ 52/202 |

FOREIGN PATENT DOCUMENTS

| | | |
|---|---|---|
| DE | 200 13 238 U1 | 11/2000 |
| EP | WO 03/008731 A1 | 1/2003 |
| GB | 1207617 | 10/1970 |
| GB | 2 353 29 A | 2/2001 |
| NL | 9301681 | 9/1993 |
| WO | WO 01/13704 A1 | 3/2001 |

OTHER PUBLICATIONS

"Energiezuinig kasdek met hoge lichtdoorlatendheid," P.J. Sonneveld and D. Waaijenberg, found at http://www.kasvandetoekomst.com/onderzoeken/IMAGdek/IMAGdek.htm.
"Zigzag Roof Plate Allows Energy Efficient Light Into Greenhouse," found at http://www.gcw.nl/wispr/new/w2002_02_04.htm.
PCT Search Report for PCT/US2004/007093.

* cited by examiner

*Primary Examiner*—Brian E. Glessner
*Assistant Examiner*—Basil Katcheves

(57) ABSTRACT

A sheet structure includes a pair of corrugated sheets formed in a zigzag pattern, the pair comprising an upper sheet and a lower sheet. In an exemplary embodiment, each of the pair of corrugated sheets further includes a flat portion disposed at selected intervals between individual zigzags. The flat portions of the upper sheet are aligned with corresponding flat portions of the lower sheet so as to maintain the upper and lower sheets in a double wall configuration.

20 Claims, 5 Drawing Sheets

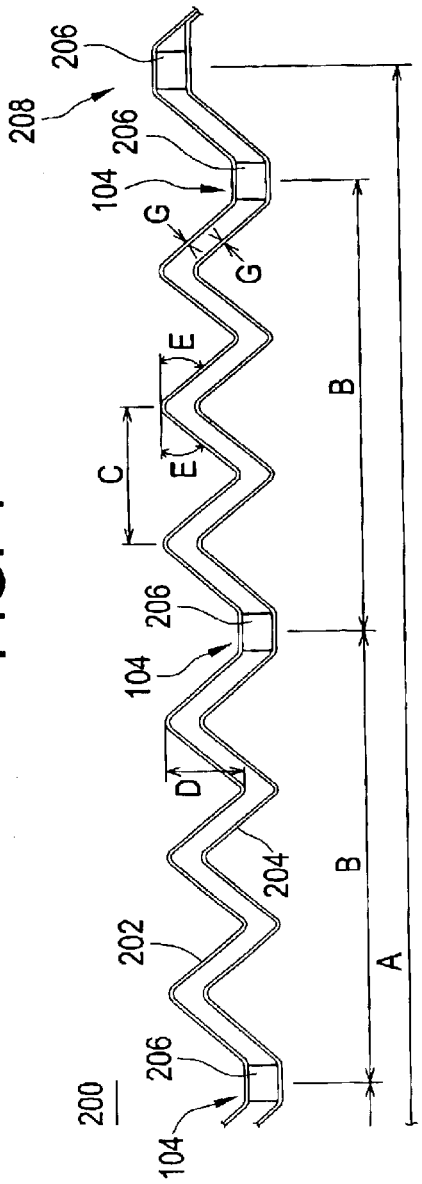
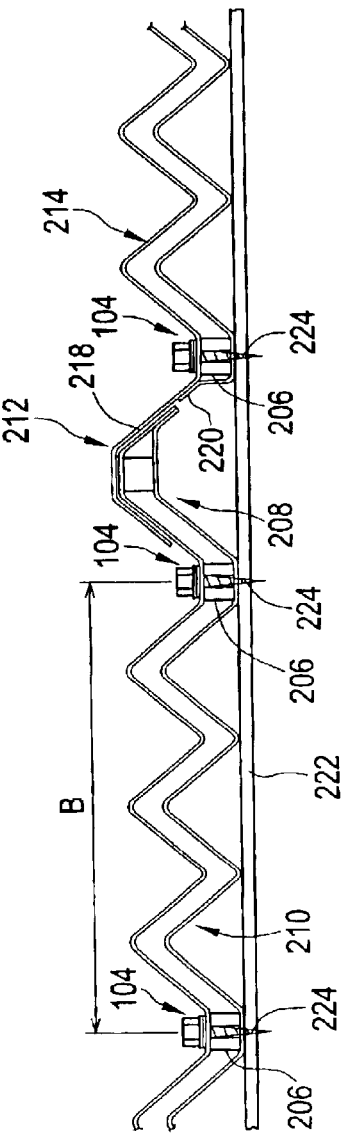

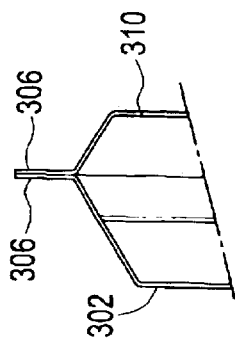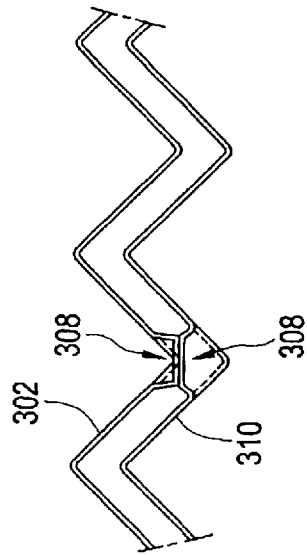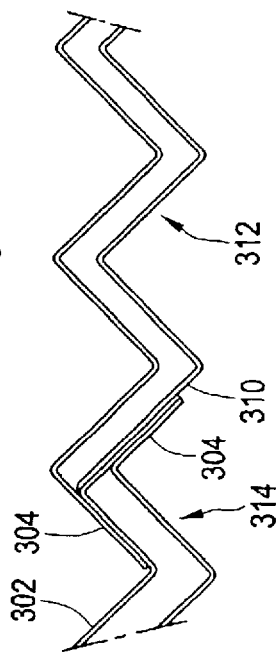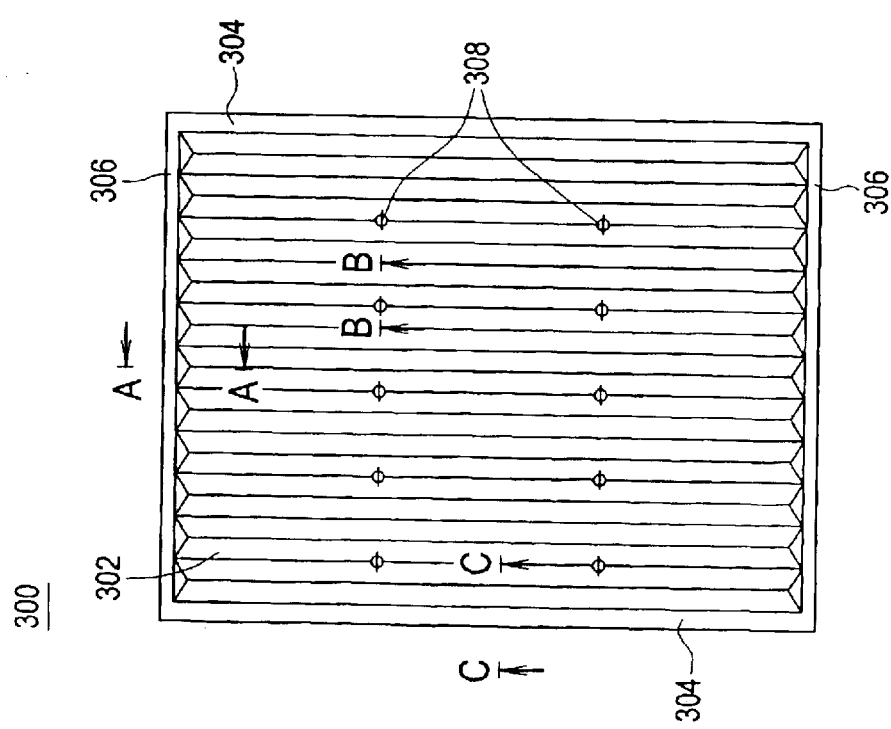

CORRUGATED POLYMERIC ZIGZAG SHEET FOR GREENHOUSE ROOF STRUCTURES

BACKGROUND OF THE INVENTION

The present disclosure relates generally to extruded sheet structures and, more particularly, to a corrugated, polymeric zigzag sheet suitable for implementation in greenhouse roof structures.

Traditional greenhouses are predominately covered by a single layer of glass having a thickness of about 4 millimeters (mm) or more. The glass roof structure offers both a high stiffness and a very high light transmissivity, which is important for the growing process of the various agricultural and horticultural crops found in greenhouses. One disadvantage of using glass as the greenhouse roof material is its heavy weight, which typically requires special devices/equipment during the installation thereof. Furthermore, there is the potential for breakage during installation, as well as from exposure to natural elements such as wind, snow load and hail storms. As a result, certain conventional greenhouse roof structures have implemented laminated glass or polymeric products as a greenhouse glazing.

Thin, transparent polymeric sheets (e.g., a polycarbonate sheet with a thickness of about 1–3 mm) have similar light transmission values to that of glass. However, the lack of stiffness of a flat thin sheet reduces its overall practical use in this particular application since a thin sheet does not withstand an expected wind/snow load. In addition, the lack of stiffness of a thin gauge polymeric sheet renders the installation thereof onto the construction members of the greenhouse problematic at best. Accordingly, rigid clear plastics fabricated by extrusion, roll forming and/or thermo-forming processes allow for a corrugated zigzag shape that does provide a desired structural stiffness. Moreover, the zigzag shape can also reduce the amount of light lost through reflection by redirecting some of the reflected light through the roof and into the greenhouse, thereby resulting in an increase of the direct and diffuse light transmission of the roof material.

Still a further consideration is the additional insulation provided by a double walled roof panel, as opposed to the single-plate hardened glass presently used in may greenhouses. While a double-plate flat glass provides an additional measure of insulation, there is a reduction in the amount of light passed therethrough. Accordingly, it is desirable to be able to manufacture a lightweight, stiff panel that both insulates and passes an increased amount of light, but that is also easy to manufacture and assemble upon a roof structure, such as used for a greenhouse.

BRIEF DESCRIPTIONS OF THE INVENTION

The above discussed and other drawbacks and deficiencies of the prior art are overcome or alleviated by a sheet structure including a pair of corrugated sheets formed in a zigzag pattern, the pair comprising an upper sheet and a lower sheet. In an exemplary embodiment, each of the pair of corrugated sheets further includes a flat portion disposed at selected intervals between individual zigzags. The flat portions of the upper sheet are aligned with corresponding flat portions of the lower sheet so as to maintain the upper and lower sheets in a double wall configuration.

In another aspect, a greenhouse roof structure includes a first corrugated, light-transmitting sheet formed in a zigzag pattern. The first corrugated sheet further includes at least one flat portion disposed at selected intervals between individual zigzags. A securing means affixes the first corrugated sheet to a roof support member, at one or more of the flat portions.

BRIEF DESCRIPTION OF THE DRAWINGS

Referring to the exemplary drawings wherein like elements are numbered alike in the several Figures:

FIG. 4 is a cross sectional view of a pair of zigzag sheets configured as a double wall zigzag sheet, in accordance with a further embodiment of the invention;

FIG. 5 is cross sectional view of a pair of double wall zigzag sheets, particularly illustrating the overlapping of the ends thereof for providing an additional sheet width;

FIG. 6 is a top view of a double wall zigzag sheet structure, in accordance with still a further embodiment of the invention, wherein the flat sections of the sheet do not extend throughout the length thereof;

FIG. 7 is a sectional end view of the double wall zigzag sheet structure, taken along the lines A—A of FIG. 6;

FIG. 8 is a sectional view of the double wall zigzag sheet structure, taken along the lines B—B of FIG. 6;

FIG. 9 is a sectional view of a pair of double wall zigzag sheet structures in overlapping engagement with one another, as shown at the location along the lines C—C of FIG. 6;

DETAILED DESCRIPTION OF THE INVENTION

Disclosed herein is a_Toc513457888n improved corrugated, polymeric zigzag sheet for greenhouse roof structures sheet that may also be combined into a double wall roof element. More particularly, the improved sheet of the present invention embodiments feature a flat section that allow the sheet assembly to be more easily be affixed on a structural support, such as the purlins (i.e., horizontal roof beams) of a greenhouse. The individual sheets may be formed from a light-transmitting material, such as a polycarbonate material or a poly methyl methacrylate (PMMA) material. One particularly suitable example includes the polycarbonate Lexan® by General Electric.

Figure 1:
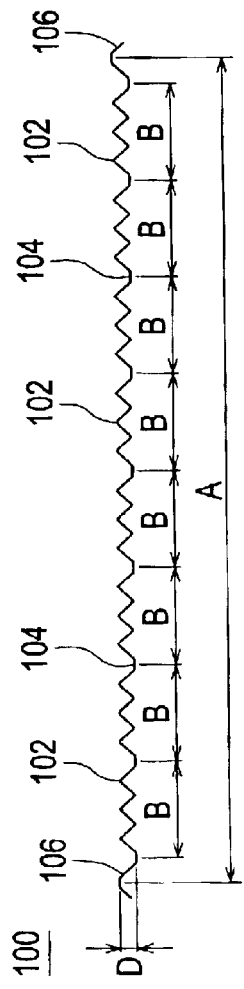
FIG. 1 is a cross sectional view of a corrugated, polymeric zigzag sheet suitable for greenhouse roof structures, in accordance with an embodiment of the invention.
Figure 2:
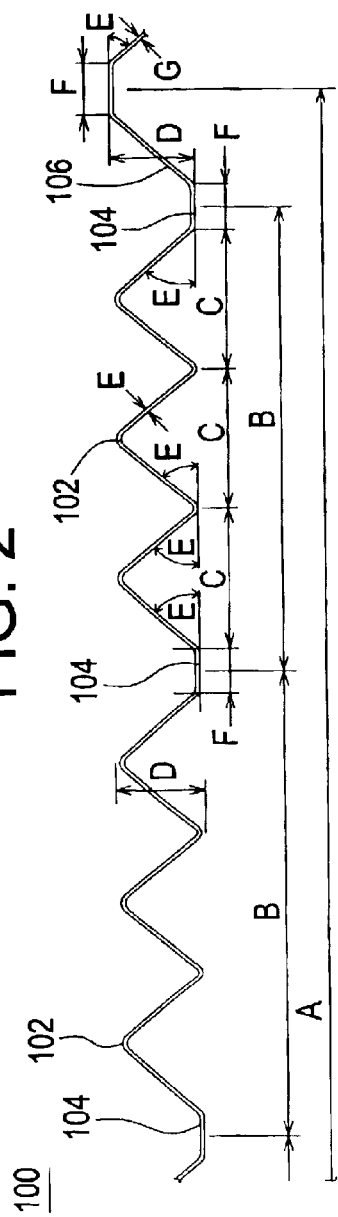
FIG. 2 is an enlarged view of the zigzag sheet of FIG. 1, particularly illustrating flat sections therein for facilitating securing of the sheet to a roof support.

Referring initially to FIGS. 1 and 2, there is shown a cross sectional view of a corrugated, polymeric zigzag sheet 100 suitable for use in greenhouse roof structures, in accordance with an embodiment of the invention. The profile of the sheet 100 features a series of triangular peaks or zigzags 102 that are separated by intervals of flat portions 104. Each end of the sheet 100 terminates in a trapezoidal shaped wing portion 106 adjacent a flat portion 104.

FIGS. 1 and 2 further illustrate exemplary dimensions for the sheet 100, wherein the reference letter "A" represents the distance between the centers of wing portions on opposite ends of the sheet 100 (with "A" ranging from about 500 millimeters to about 2000 millimeters, for example). The reference letter "B" represents the distance between the centers of the flat portions 104 between zigzag intervals (with "B" ranging up to about 300, for example).

In addition, the reference letter "C" represents the width of an individual zigzag 102 (with "C" ranging from about 10 millimeters to about 100 millimeters, and more preferably from about 30 millimeters to about 70 millimeters, for example); the reference letter "D" represents the height of an individual zigzag 102 (with "D" ranging up to about 100 millimeters, for example); the reference letter "E" represents the horizontal angle of the zigzag walls, (with "E" ranging from about 45 degrees to about 75 degrees, and more preferably from about 45 degrees to about 60 degrees, for example); the reference letter "F" represents the width of an individual flat portion 104 (with "F" ranging from about 15 millimeters to about 50 millimeters, and more preferably from about 20 millimeters to about 40 millimeters, for example); and the reference letter "G" represents the thickness of sheet 100 (with "G" ranging from about 0.5 millimeters to about 6 millimeters, and preferably from about 0.5 millimeters to about 2 millimeters, for example).

Figure 3:
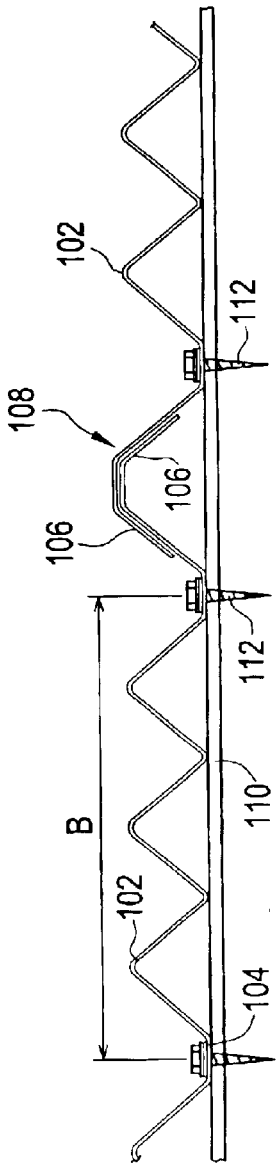
FIG. 3 is a cross sectional view of a pair of zigzag sheets, particularly illustrating the overlapping of the ends thereof for providing an additional sheet width.

FIG. 3 is a cross sectional view of a pair of zigzag sheets 100, particularly illustrating how the configuration of the trapezoidal shaped wing portions 106 thereof facilitate the overlapping of two sheets, as shown at 108, in order to result in additional sheet width. In addition, FIG. 3 also illustrates the use of flat portions 104 to secure the sheets 100 to a roof support member, such as purlin 110. This may be accomplished through a suitable attaching means, such as with self-tapping screws 112.

Referring now to FIG. 4, there is shown a cross sectional view of a pair of zigzag sheets configured together to form a double wall zigzag sheet 200, in accordance with a further embodiment of the invention. An upper sheet 202 is separated from a lower sheet 204 through means of a distance holder or spacer 206, which is located at each of the aligned flat portions 104 between the upper and lower sheets 202, 204. The spacer 206 may be made from a variety of materials such as transparent polycarbonate or aluminum, for example, and may be affixed to the upper and lower sheets 202, 204 by gluing or other suitable bonding means. It will also be noted that a first end 208 of the double wall sheet 200 is also provided with a spacer 206.

As is the case with the single wall zigzag sheet configuration of FIGS. 1–3, the double wall sheet 200 is also suited for overlapping with an adjacent double wall sheet, so as to increase the overall width of the double wall design as desired. This is illustrated in FIG. 5. In the embodiment depicted, the first end 208 of a first double wall sheet 210 is overlapped by a second or opposing end 212 of a second double wall sheet 214. To maintain a relatively uniform profile, the opposing end 212 of second double wall sheet 214 has its upper sheet 218 extending out in a manner similar to the trapezoidal shaped wing portion 106 of the single sheet embodiment. However, it is also contemplated that the lower sheet 220 of second double wall sheet 214 could also be extended out into a trapezoidal wing. FIG. 5 further illustrates the ability to affix the double wall sheet to a purlin 222 or other roof support structure with a securing mechanism 224 (e.g., screws) passing through the upper and lower sheets, as well as the spacer 206. Again, as is the case with the single wall zigzag embodiment, the presence of the flat portions 104 allows for securing the sheet to the purlin 222 at regular intervals between series of zigzags.

Referring generally now to FIGS. 6 through 14, there is shown a double wall, zigzag roof structure 300 in accordance with still another embodiment of the invention. In contrast to the embodiments of FIGS. 1–5, the flat portions of structure 300 do not extend through the entire length of the sheets, but instead are localized at the point of attachment to the purlin or other support member. In particular, FIG. 6 is a top view of the double wall zigzag structure 300 that illustrates an upper sheet 302, side laps 304, end laps 306 and a plurality of flat portions 308. Although depicted in subsequent views, the lower sheet of double wall structure 300 is not shown in FIG. 6.

FIG. 7 is a sectional end view of the double wall zigzag sheet structure 300, taken along the lines A—A of FIG. 6, which illustrates the flat end laps 306 of the upper sheet 302 and the lower sheet 310 sealed together in order to close the open space between the two sheets. As shown in FIG. 8, however, the flat portions 308 of both the upper and lower sheets 302, 310 are comprised of inwardly disposed U-shaped sections that are aligned such that the upper and lower sheets 302, 310 abut one another at these corresponding locations. Thus, in this embodiment, the spacer function is actually carried out by the configuration of the flat portions 308 of the sheets, in contrast to the separate spacer component in the embodiment of FIGS. 4 and 5. However, similar to the embodiment of FIGS. 4 and 5, the double wall zigzag sheet structure 300 is configured to be able to overlap another sheet to provide additional width, as is shown in FIG. 9. As can be seen, the side lap 304 of a first double wall sheet 312 is downwardly disposed so as to overlap the upper sheet 302 of a second double wall sheet 314. Correspondingly, the side lap 304 of the second double wall sheet 314 is downwardly disposed so as to receive the lower sheet 310 in an overlapping fashion thereupon.

Figure 10:
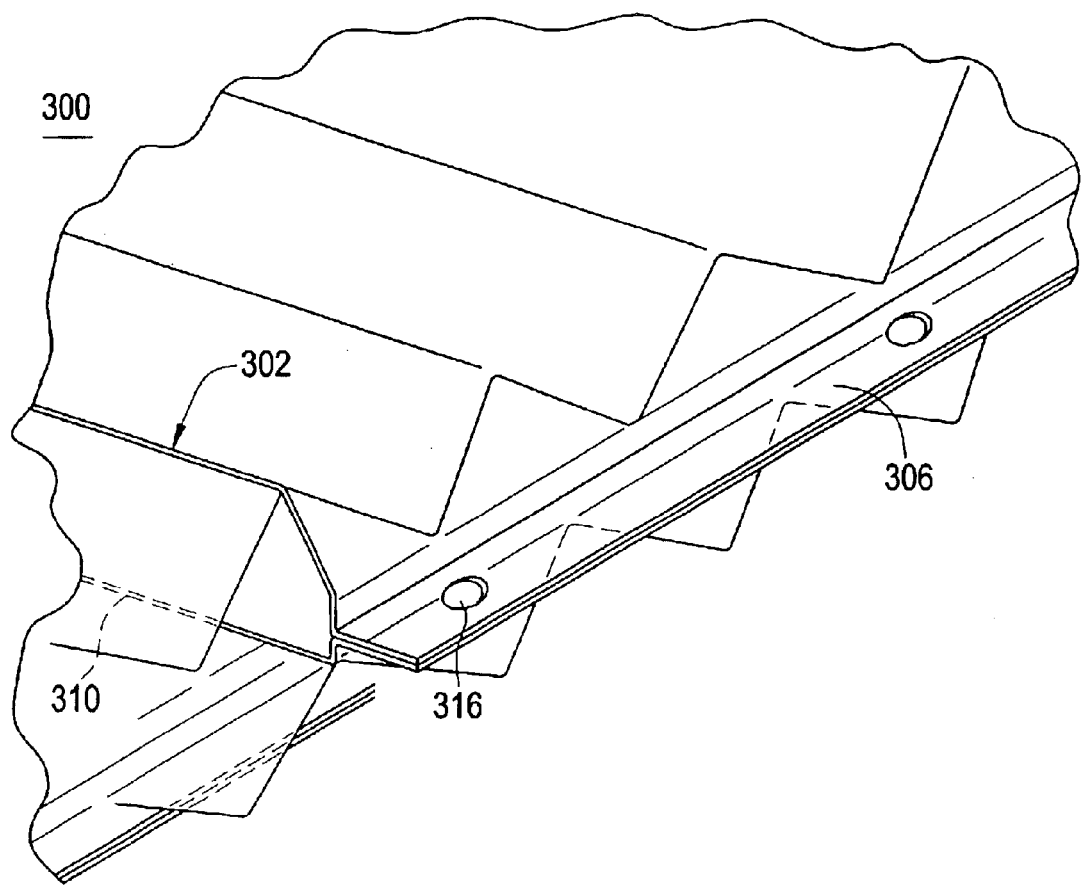
FIG. 10 is an enlarged perspective view in cross sectional detail of a portion of an end of the sheet structure of FIG. 6, illustrating the configuration of the end lap.
Figure 11:
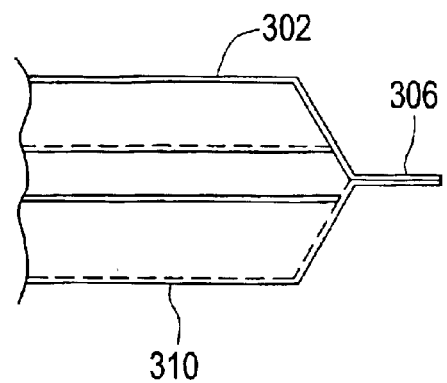
FIG. 11 is another cross sectional view of the upper and lower sheets along the end lap.

FIGS. 10–14 illustrate in greater detail the end and side sections of the double wall sheet structure 300. FIG. 10 is a perspective view (also in cross sectional detail) of a portion of an end of sheet structure 300, illustrating the configuration of the end lap 306 by joining the upper sheet 302 and lower sheet 310. Optionally, the end laps 306 may be provided with mounting holes 316 for securing the sheet structure. FIG. 11 is another cross sectional view of the upper and lower sheets along the end lap 306.

Figure 12:
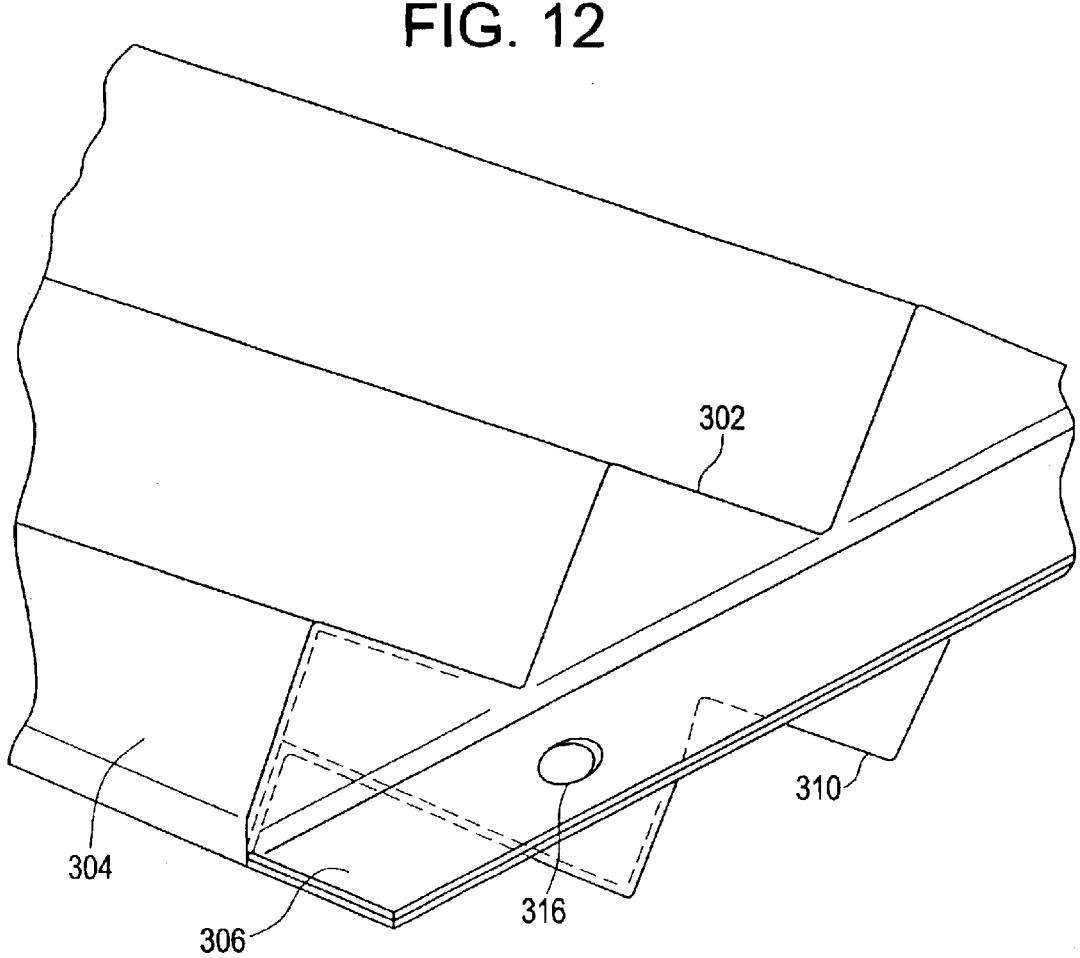
FIG. 12 is a perspective view of a corner of the sheet structure, wherein both a side lap and an end lap are illustrated.
Figure 13:
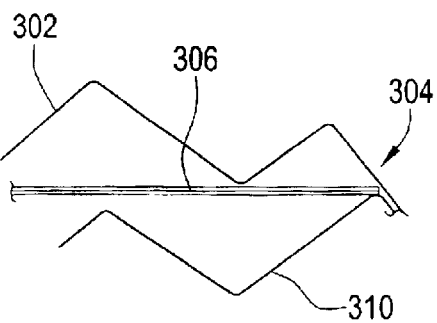
FIGS. 13 and 14 are side views taken along opposite ends of the sheet structure, illustrating the configuration of the side laps.
Figure 14:
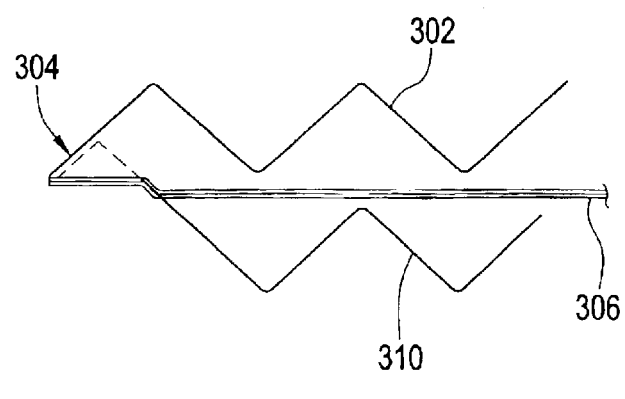

Finally, referring to FIG. 12–14, there is shown a perspective view (FIG. 12) of a corner of the sheet structure 300, wherein both a side lap 304 and an end lap 306 are illustrated. As stated previously, the side lap 304 may be biased in a downward direction in order to overlap the double wall sheet structure with another adjacent sheet. Opposing ends of the sheet structure 300 are shown in FIGS. 13 and 14, wherein opposite side laps 304 are illustrated.

The sheet structures of the present invention embodiments may be made in different ways, depending on the particular configuration thereof. If the flat portions are made to extend over the total length of the sheet as in FIGS. 1 through 5, then a direct extrusion roll forming process may be used. On the other hand, if the flat portions do not extend over the total length of the sheet as in FIG. 6, then the sheet structure may be manufactured by thermoforming a pair of flat sheets. The particular number of flat portions formed on a given sheet will generally depend upon the desired stiffness of the double walled roof element. In turn, the stiffness is determined several other factors such as the plastic material used for the manufacture of the sheet, the thickness, the configuration of zigzag profile, etc.

Regardless of the configuration of the flat portions, the sheet structure embodiments disclosed herein are characterized by individual, corrugated zigzag sheets for increasing the overall stiffness thereof, thus improving upon expected wind/snow loading conditions. Specifically, the impact properties of polycarbonate in combination with the zigzag shape make the zigzag panel extremely resistant to the adverse effects of hailstorms. The outer surface (i.e. the upper sheets) may include a UV protection layer applied thereto, which avoids excessive weathering. In addition, the zigzag configuration decreases the light reflection upon a greenhouse roof structure. Accordingly, the total amount of light transmitting through the sheet structure into the greenhouse is higher than compared with single flat glass.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A sheet structure, comprising:
   a pair of corrugated sheets formed in a zigzag pattern, said pair comprising an upper sheet and a lower sheet; and
   each said pair of corrugated sheets further including a flat portion disposed at selected intervals between individual zigzags;
   a spacer element disposed between corresponding flat portions of said upper and lower sheets; and
   securing means for affixing said pair of corrugated sheet to a support member, at one or more of said flat portions, said securing means extending through said spacer element and said corresponding flat portions of said upper and lower sheets;
   wherein said flat portions of said upper sheet are aligned with corresponding flat portions of said lower sheet so as to maintain said upper and lower sheets in a double wall configuration.

2. The structure of claim 1, wherein said flat portions are further disposed along the length of said corrugated sheets.

3. The structure of claim 1, wherein said zigzag pattern is characterized by a series of triangular peaks.

4. The structure of claim 3, further comprising a trapezoidal shaped wing, formed along opposing sides of said pair of sheets, each said trapezoidal shaped wing having said upper sheet in contact with said lower sheet along at least a portion thereof.

5. The structure of claim 1, wherein selected portions of said upper sheet are formed so as to come into contact with corresponding selected portions of said lower sheet, thereby forming said flat portions.

6. The structure of claim 5, wherein said flat portions further comprise inwardly disposed U-shaped sections of said upper and lower sheets.

7. The structure of claim 6, further comprising side laps disposed at opposing side edges of the structure, said side laps formed by joining said upper and lower sheets together.

8. The structure of claim 7, further comprising end laps disposed at opposing ends of the structure, said end laps formed by joining said upper and lower sheets together.

9. The structure of claim 7, wherein said side laps are downwardly disposed so as to accommodate overlapping with an adjacent sheet structure.

10. The structure of claim 1, wherein said upper and lower sheets are formed from a light-transmitting, polycarbonate material.

11. A roof structure, comprising:
    a first corrugated, light-transmitting sheet formed in a zigzag pattern, said first corrugated sheet further including at least one flat portion disposed at selected intervals between individual zigzag;
    a second corrugated, light-transmitting sheet formed in a zigzag pattern, said second corrugated sheet also including a flat portion disposed at selected intervals between individual zigzags;
    said first and said second sheets arranged into an upper sheet and a lower sheet wherein said flat portions of said upper sheet are aligned with corresponding flat portions of said lower sheet so as to maintain said upper and lower sheets in a double wall configuration;
    a spacer element disposed between corresponding flat portions of said upper and lower sheets; and
    securing means for affixing said first corrugated sheet to a roof support member, at one or more of said flat portions, said securing means extending through said spacer element and said corresponding flat portions of said upper and lower sheets.

12. The roof structure of claim 11, further comprising a trapezoidal shaped wing formed at opposing sides of said first and second sheets, wherein said trapezoidal shaped wing is configured so as to accommodate overlapping with an adjacent sheet.

13. The roof structure of claim 11, wherein said zigzag pattern is characterized by a series of triangular peaks.

14. The roof structure of claim 11, wherein said flat portions are further disposed along the length of said corrugated sheets.

15. The roof structure of claim 11, wherein selected portions of said upper sheet are formed so as to come into contact with corresponding selected portions of said lower sheet, thereby forming said fist portions.

16. The roof structure of claim 15, wherein said flat portions further comprise inwardly disposed U-shaped sections of said upper and lower sheets.

17. The roof structure of claim 16, further comprising side laps disposed at opposing side edges of the structure, said side laps formed by joining said upper and lower sheets together.

18. The roof structure of claim 17, further comprising end laps disposed at opposing ends of the structure, said end laps formed by joining said upper and lower sheets together.

19. The roof structure of claim 17, wherein said side laps are downwardly disposed so as to accommodate overlapping with an adjacent double wall sheet.

20. The roof structure of claim 11, further comprising a trapezoidal shaped wing, formed along opposing sides of said upper and lower sheets, each said trapezoidal shaped wing having said upper sheet in contact with said lower sheet along at least a portion thereof.

* * * * *